(No Model.)
S. G. PERRY.
DENTAL ENGINE ATTACHMENT.
No. 343,845. Patented June 15, 1886.
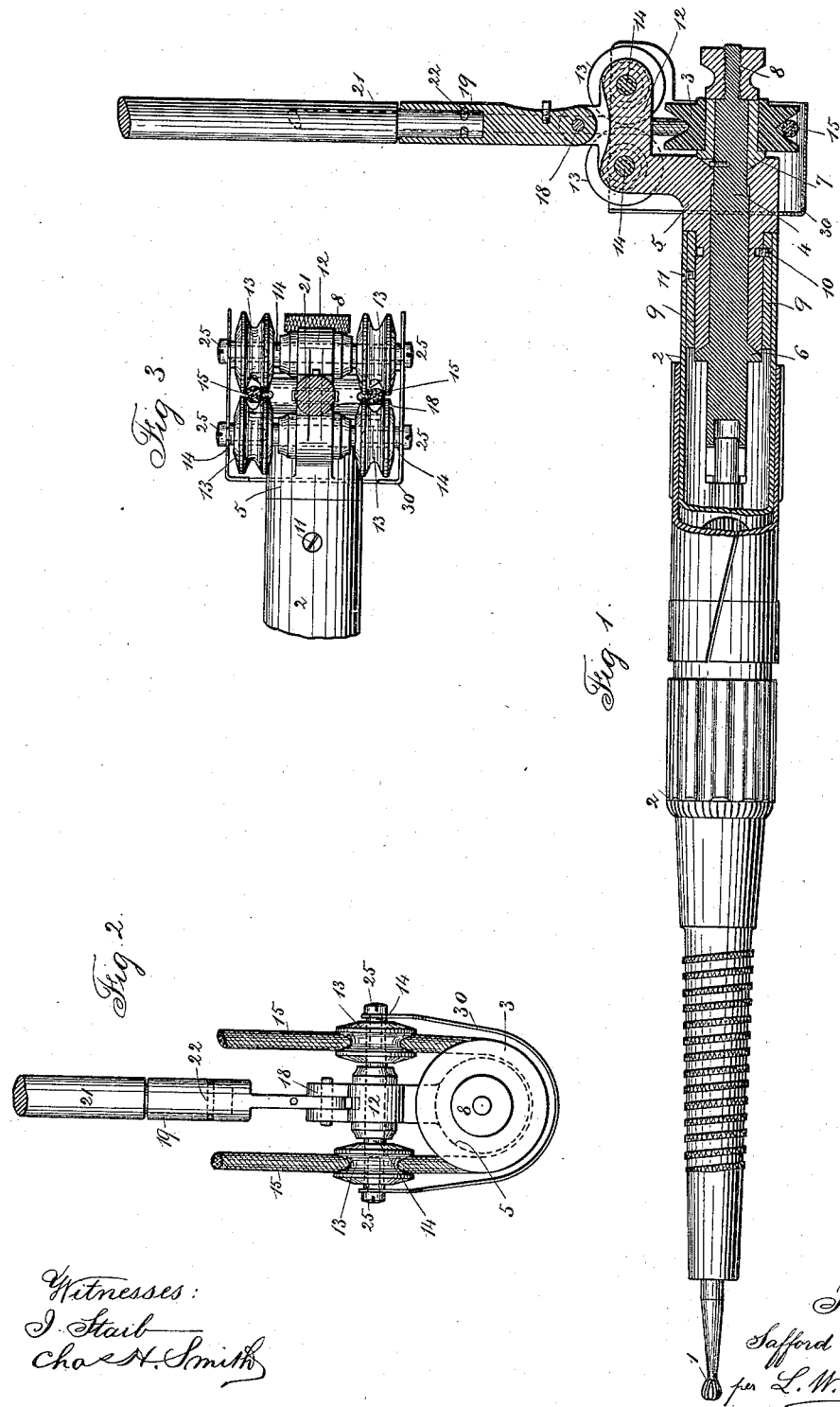
Witnesses:
J. Staib
Chas. H. Smith
Inventor:
Safford G. Perry
per L. W. Serrell
atty

UNITED STATES PATENT OFFICE.

SAFFORD G. PERRY, OF NEW YORK, N. Y.

DENTAL-ENGINE ATTACHMENT.

SPECIFICATION forming part of Letters Patent No. 343,845, dated June 15, 1886.

Application filed April 17, 1886. Serial No. 199,175. (No model.)

*To all whom it may concern:*

Be it known that I, SAFFORD G. PERRY, of the city and State of New York, have invented an Improvement in Attachments for Dental Engines, of which the following is a specification.

Dental and surgical instruments have been driven by an engine the endless belt of which passes over pulleys, and in some instances radius bars or arms have been made use of, extending from one pulley to another, to maintain the proper tension on the belt, and the arms have been attached so as to allow of the hand-piece swiveling or being turned to any desired angle to the radius bar or arm. Difficulty, however, arises in using instruments of this class, in consequence of the parts of the belt becoming twisted together or binding upon the pulleys, and it is very difficult to apply the radius-bars and belt in such a manner that the dental hand-piece can be easily turned into any desired position in drilling or other dental operations.

My improvements are made to overcome the practical difficulties heretofore existing in this class of attachments for dental engines, and said improvements consist in the combinations of devices hereinafter set forth.

In the drawings, Figure 1 is an elevation of a dental hand-piece with the rear portion in section. Fig. 2 is an elevation at the rear end of the attachment, and Fig. 3 is a plan view of the pulleys and stock.

The dental hand-piece does not form any necessary part of my invention. The same may be a drill, plugger, right-angle instrument, or other device.

I have represented in the drawings a drill or tool, 1, and a case or hand-piece, 2, surrounding the working parts. The pulley-stock 5 has a hole passing horizontally through it, for the reception of the arbor 4, and there is a conical washer, 6, around the arbor 4, setting into a conical bearing at one end of the pulley-stock 5, and there is a second conical washer, 7, against a similar bearing at the other end of the pulley-stock. This conical bearing 7 is formed with or attached to the pulley 3, surrounding the arbor 4, and secured thereto by the screw and nut 8, which also serve to tighten the conical bearings and compensate for any wear in the parts. There may be also a pin upon the arbor entering a slot in the eye of the pulley 3 or in the conical bearing 7. Around the tubular portion of the pulley-stock is a tubular connection, 9, that is free to be revolved around the pulley-stock, and there is a pin or screw, 10, passing into a peripheral groove in the pulley-stock, to prevent the connection 9 slipping off the pulley-stock, and the case 2 of the dental hand-piece or other instrument is attached to this tubular connection 9 by the screw 11 or other suitable attaching device. It will be apparent that the case of the dental hand-piece can now be turned or swiveled upon the tubular connection 9, so that in handling the said hand-piece the operator can either revolve the same between his fingers or swivel the parts into any desired position, regardless of the direction in which the driving-belt may lead to the pulley 3, as hereinafter described.

The arbor 4 is extended within the case and connected with the drill or other tool in any desired manner, as common in dental hand-pieces.

The pulley-stock 5 is extended upwardly in the form of a frame, 12, upon the opposite sides of which are the guide-pulleys 13, upon the screw-arbors 14. There are four of these guide-pulleys, so that the belt 15 may pass down between one pair of guide-pulleys 13, beneath and around the pulley 3, and up between the the other pair of guide-pulleys 13, and the frame 12 overhangs the pulley 3, so that the pairs of pulleys 13 are brought into conveniently close proximity to the pulley 3. Upon the top of the frame 12 is a knuckle-joint, 18, connecting the lower end of the socket 19 to the frame 12, immediately over the center of the pulley 3 and midway between the pairs of guide-rollers 13. The lower end of the radius-bar 21 enters the socket 19, and the upper end of this radius-bar is received into a similar socket adjacent to pulleys around which the belt 15 runs. The parts to which the upper end of the radius-bar 21 are connected and the devices for giving motion to the belts are well known in dental and surgical engines, and do not form any necessary part of the present invention. There is a stop-pin, 22, passing across the socket 19, through a groove that partially surrounds the lower end of the radius-bar 21. This prevents the socket and radius-bar becoming disconnected and at the same time limits the movement of the socket, as it may be turned around the radius-bar, thereby preventing the hand-piece being turned around the radius-bar to such an extent as to twist the belt 15 and cause the parts thereof to bind against each other.

The joint 18 is such that the hand-piece may be swung into line, or nearly so, with the radius-bar 21, thereby allowing the dental hand-piece to be moved into any desired position relatively to the radius-bar without interfering with the rotation of the arbor by the belt, because such belt will be guided between and drawn over the guide-pulleys in either one direction or the other.

It is preferable to make the screw-arbors 14 sufficiently long to allow a small amount of lateral play to the pulleys 13, so that they will easily accommodate themselves to the belt 15 as it passes toward and from the pulley 3. I make use of a shield, 30, passing around below the pulley 3, to keep the hand from coming in contact with such pulley, and the upper edges of this shield are notched for the passage of the screws 25, that pass into the ends of the arbors 14 and secure the said shield in its position.

I claim as my invention—

1. The combination, with the pulley-stock, of the arbor 4, passing through the same, the pulley 3 upon said arbor 4, the tubular connection 9 around the pulley-stock, and the case of the dental drill or other instrument fastened to the tubular connection 9, substantially as set forth.

2. The combination, with the pulley-stock and the arbor in a dental engine, of a frame extending above the pulley-stock, pairs of pulleys and screw-arbors for supporting the same, a socket, 19, for the end of the radius-bar 21, and a joint for connecting the end of the socket to the frame of the pulley-stock, substantially as set forth.

3. The combination, with the pulley-stock and pulley, of the arbor with a conical collar upon the same against one end of the pulley-stock, a pulley and a cone between the pulley and the other end of the pulley-stock, and a screw at the end of the arbor for holding the pulley upon the arbor and adjusting the conical bearings, substantially as set forth.

4. The combination, with the pulley-stock, arbor, and pulley, of the guide-rollers attached to the frame portion of the pulley-stock, a radius-bar, a socket for the same, and a hinge for connecting the socket to the pulley-stock frame, and a shield surrounding the pulley and supported by the arbors of the guide-pulleys, substantially as set forth.

Signed by me this 10th day of April, A. D. 1886.

SAFFORD G. PERRY.

Witnesses:
 WM. H. DOTY,
 SPENCER C. DOTY.